(12) United States Patent
Liu et al.

(10) Patent No.: US 11,756,545 B2
(45) Date of Patent: Sep. 12, 2023

(54) METHOD AND DEVICE FOR CONTROLLING OPERATION MODE OF TERMINAL DEVICE, AND MEDIUM

(71) Applicant: BEIJING XIAOMI MOBILE SOFTWARE CO., LTD., Beijing (CN)

(72) Inventors: Rong Liu, Beijing (CN); Liang Xuan, Beijing (CN); Haixin Du, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 234 days.

(21) Appl. No.: 17/241,003

(22) Filed: Apr. 26, 2021

(65) Prior Publication Data
US 2022/0051667 A1 Feb. 17, 2022

(30) Foreign Application Priority Data
Aug. 11, 2020 (CN) .......................... 202010810611.8

(51) Int. Cl.
  G10L 15/22  (2006.01)
  G06F 3/04817 (2022.01)
  G06F 3/16  (2006.01)
  G10L 15/07 (2013.01)
  G10L 15/19 (2013.01)

(52) U.S. Cl.
  CPC .......... G10L 15/22 (2013.01); G06F 3/04817 (2013.01); G06F 3/167 (2013.01); G10L 15/07 (2013.01); G10L 15/19 (2013.01); G10L 2015/223 (2013.01); G10L 2015/225 (2013.01)

(58) Field of Classification Search
  CPC ......... G10L 15/22; G10L 15/07; G10L 15/19; G10L 2015/223; G10L 2015/225; G06F 3/167; G06F 3/04817
  See application file for complete search history.

(56) References Cited

U.S. PATENT DOCUMENTS

2006/0089834 A1  4/2006  Mowatt et al.
2009/0253463 A1  10/2009  Shin et al.
(Continued)

FOREIGN PATENT DOCUMENTS

EP  1650744 A1  4/2006
EP  2109295 A1  10/2009
(Continued)

OTHER PUBLICATIONS

Extended European Search Report in the European Application No. 21170680.9, dated Oct. 26, 2021, (9p).

*Primary Examiner* — Mohammad K Islam
(74) *Attorney, Agent, or Firm* — Arch & Lake LLP

(57) ABSTRACT

A method and a device for controlling an operation mode of a terminal device, and a medium are provided. The method includes that: based on a received voice mode activation instruction under a preset condition, a voice operation learning mode is entered and a voice operation learning interface is displayed. The voice operation learning interface is configured to guide a user to output a voice instruction. The method further includes that: upon completion of the voice operation learning mode, a voice operation mode is entered; voice information is received in the voice operation mode; and the terminal device is controlled according to the voice instruction in the received voice information to execute an operation corresponding to the voice instruction.

14 Claims, 12 Drawing Sheets

(56) References Cited

U.S. PATENT DOCUMENTS

| | | | |
|---|---|---|---|
| 2015/0126252 A1 | 5/2015 | Youn et al. | |
| 2017/0019515 A1 | 1/2017 | Youn et al. | |
| 2017/0206901 A1* | 7/2017 | Gunn | G10L 15/08 |
| 2017/0213553 A1* | 7/2017 | Gunn | G06F 1/3234 |
| 2017/0257470 A1 | 9/2017 | Youn et al. | |
| 2019/0304460 A1* | 10/2019 | Gunn | G06F 1/3206 |
| 2019/0369868 A1* | 12/2019 | Tang | G06F 3/04812 |
| 2020/0118544 A1* | 4/2020 | Lee | G10L 15/063 |
| 2020/0118548 A1* | 4/2020 | Huang | G10L 15/22 |
| 2020/0118559 A1* | 4/2020 | Huang | G06F 40/30 |
| 2021/0286867 A1 | 9/2021 | Zheng et al. | |

FOREIGN PATENT DOCUMENTS

| | | | | |
|---|---|---|---|---|
| EP | 4123609 A1 * | 2/2018 | | G08B 13/1672 |
| EP | 3575950 A1 | 12/2019 | | |
| EP | 3869504 A1 | 8/2021 | | |
| TW | 202016694 A * | 5/2020 | | G06F 3/017 |
| WO | 2010018453 A2 | 2/2010 | | |
| WO | 2020114213 A1 | 6/2020 | | |
| WO | WO-2021050170 A1 * | 3/2021 | | G06F 40/30 |

\* cited by examiner

METHOD AND DEVICE FOR CONTROLLING OPERATION MODE OF TERMINAL DEVICE, AND MEDIUM

CROSS-REFERENCE TO RELATED APPLICATIONS

This application is based upon and claims priority to Chinese Patent Application No. 202010810611.8, filed on Aug. 11, 2020, the entire content of which is incorporated herein by reference in its entirety for all purposes.

BACKGROUND

At present, a main operation mode of a terminal device is to perform information recording and operation in a manner that a user touches a display screen of the terminal device through a limb. In such an operation mode, double hands of the user are confined, and the user can hardly carry out other activities requiring the double hands while operating the terminal device.

For reducing a dependence on a limb of a user in an operation process of a terminal device and enabling the user to carry out other activities requiring participation of double hands while operating the terminal device, adopting voice control instead of touch control is an important research direction.

However, the existing voice recognition control still has the problems such as inaccurate judgment of voice instructions and insufficient intelligence for voice control, so that user experiences are poor.

SUMMARY

The present disclosure relates generally to the field of intelligent devices, and more particularly, to a method and device for controlling an operation mode of a terminal device, and a medium.

According to a first aspect of the present disclosure, a method for controlling an operation mode of a terminal device is provided. The method includes that:
based on a received voice mode activation instruction under a preset condition, a voice operation learning mode is entered and a voice operation learning interface is displayed. The voice operation learning interface is configured to guide a user to output a voice instruction. The method further includes that: upon completion of the voice operation learning mode, a voice operation mode is entered. In the voice operation mode, the terminal device is controlled by receiving voice information in response to determining that no touch information is received.

Moreover, the method includes that: voice information is received in the voice operation mode; and the terminal device is controlled according to a voice instruction in the received voice information to execute an operation corresponding to the voice instruction.

According to a second aspect of the present disclosure, a device for controlling an operation mode of a terminal device is provided. The device includes: a processor and a memory coupled with the processor and configured to store an instruction that, when executed by the processor, causes the processor to: based on a received voice mode activation instruction under a preset condition, enter a voice operation learning mode and display a voice operation learning interface. The voice operation learning interface is configured to guide a user to output a voice instruction. Further, the processor is caused to: upon completion of the voice operation learning mode, enter a voice operation mode. In the voice operation mode, the terminal device is controlled by receiving voice information in response to determining that no touch information is received.

Moreover, the processor is caused to: receive voice information in the voice operation mode; and control the terminal device according to a voice instruction in the received voice information to execute an operation corresponding to the voice instruction.

According to a third aspect of the present disclosure, there is provided a non-transitory computer-readable storage medium, having stored thereon an instruction that, when executed by a processor of a terminal device, enables the terminal device to perform acts including: based on a received voice mode activation instruction under a preset condition, entering a voice operation learning mode and displaying a voice operation learning interface. The voice operation learning interface is configured to guide a user to output a voice instruction. Further, the instruction enables the terminal device to perform acts including: upon completion of the voice operation learning mode, entering a voice operation mode. In the voice operation mode, the terminal device is controlled by receiving voice information in a case that no touch information is received.

Moreover, the instruction enables the terminal device to perform acts including: receiving voice information in the voice operation mode; and controlling the terminal device according to a voice instruction in the received voice information to execute an operation corresponding to the voice instruction.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Figure 1:
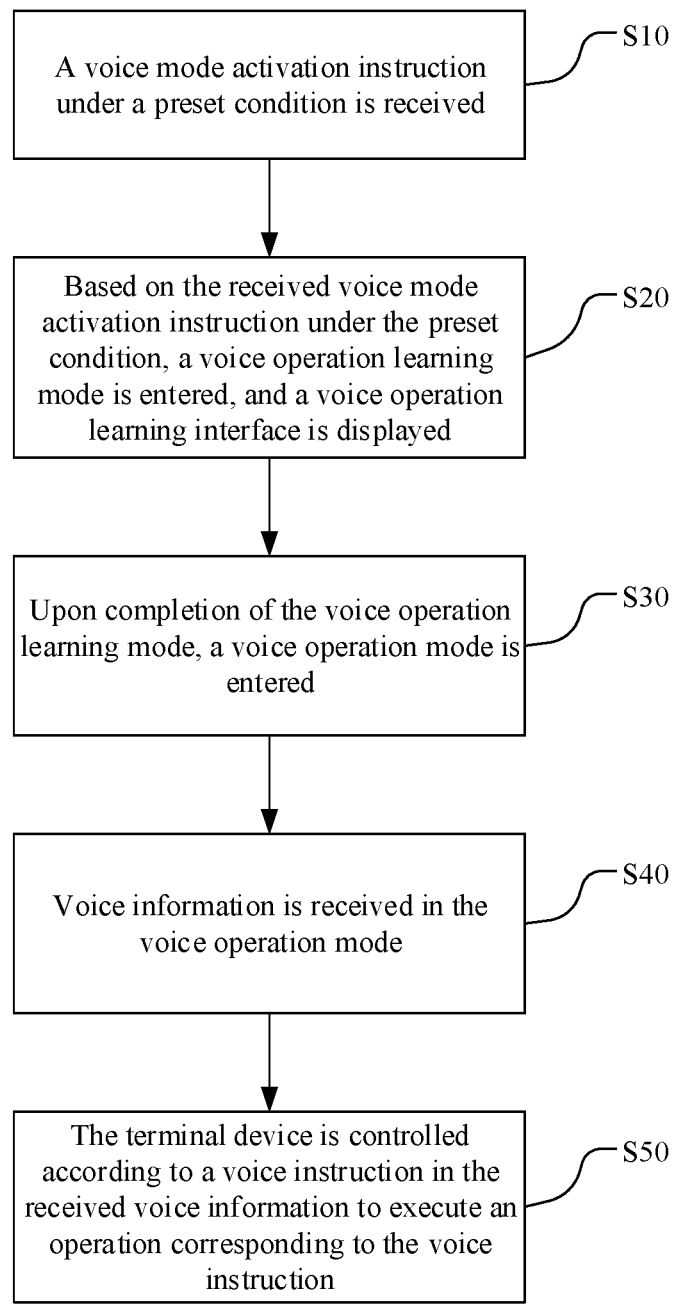
FIG. 1 is a flowchart of a method for controlling an operation mode of a terminal device according to one or more examples.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

At present, a main operation mode of a terminal device is to perform information recording and operation in a manner that a user touches a display screen of the terminal device through a limb. In such an operation mode, double hands of the user are confined, and the user can hardly carry out other activities requiring the double hands while operating the terminal device.

For reducing a dependence on a limb of a user in an operation process of a terminal device and for enabling the user to carry out other activities requiring participation of double hands while operating the terminal device, adopting voice control instead of touch control is an important research direction.

However, at present, in the field of voice control, a manner of calculating a result on line according to voice information input by a user and returning the result to the user for displaying is adopted more, relatively complex control over a terminal device cannot be implemented according to instruction information in the voice information of the user. The user is still required to touch a display screen of the terminal device with double hands to implement operations such as clicking, dragging and sliding over the terminal device, and the purpose of freeing the hands of the user cannot be achieved.

In the related art, depending on Android systems, some domestic products relatively outstanding in the field of voice recognition have emerged, and can process voice instructions of users on line and give feedbacks. However, these products have yet not been able to be applied in a process of direct control of terminal devices.

At present, Apple and Google have launched terminal devices with voice control functions. However, these terminal devices have many defects that, for example, control in Chinese is not supported, a command qualification range is limited greatly, an executable operating command cannot be matched intelligently and there is no user learning guidance process, and all these defects influence user experiences greatly.

The present disclosure provides a method for controlling an operation mode of a terminal device. The method is applied to a terminal device such as a mobile phone and a tablet computer. According to the method in the present disclosure, a voice operation mode is activated as required by a user, and in the mode, the user can control the terminal device through a voice and the terminal device can execute an operation corresponding to a voice instruction. In a processing process of the received voice information, a target voice inconsistent with a preset language rule can be corrected, so that the determined voice instruction is more explicit, the condition that the terminal device does not execute any operation after the user gives the voice instruction is unlikely to occur, a good interaction effect is achieved between the terminal device and the user, and better user experiences are provided.

According to one or more examples, the present disclosure provides a method for controlling an operation mode of a terminal device. The method in the embodiment can be applied to the terminal device such as a mobile phone and a tablet computer. Moreover, an application scenario in the embodiment is that double hands of a user are occupied and the terminal device cannot be controlled in a touch manner. As illustrated in FIG. 1, the method in the embodiment includes the following operations.

In S10, a voice mode activation instruction under a preset condition is received.

Here, the voice mode activation instruction can be an instruction input in a voice manner, or can be an instruction input in a touch manner. For example, when the hands of the user have been occupied, the user can input the voice mode activation instruction in the voice input manner. For another example, when the user knows that another thing is to be processed next but the hands are occupied and the terminal device cannot be operated in the touch manner, before the hands are occupied, the voice mode activation instruction is input at first in the touch manner to activate a voice operation mode.

In S20, based on the received voice mode activation instruction under the preset condition, a voice operation learning mode is entered, and a voice operation learning interface is displayed.

The preset condition can be, for example, that the voice mode activation instruction is issued for the first time, namely the voice operation mode is activated for the first time. For another example, the preset condition can also be that the voice mode activation instruction is issued for the first three times, namely the voice operation mode is activated for the first three times, to help the user to quickly master how to control the terminal device through a correct voice instruction in an initial stage of using the voice operation mode by the user.

After the voice operation learning mode is entered, the user is taught and guided, and the voice operation learning interface is displayed on a display screen. Guidance information can be displayed on the voice operation learning interface, and the guidance information is a voice instruction recognizable for the terminal device in the voice operation mode, to guide the user on what is a correct instruction.

Meanwhile, on the displayed learning interface, when the user inputs the guidance information displayed on a display interface in the voice manner, a content input by the user through a voice can be displayed in a text form on the display interface to prompt the user that the terminal device receives the voice instruction input by the user.

In addition, since the user is in the voice operation learning mode, for enabling the user to clearly know that the voice instruction input by the user is correct, encouragement contents can also be displayed in the text form on the display interface to improve an interaction effect.

In S30, upon completion of the voice operation learning mode, a voice operation mode is entered.

In the voice operation mode, the terminal device is controlled by receiving voice information in a case that no touch information is received.

In the voice operation learning mode, multiple voice instructions can be learned such that the user can fully master the voice instructions to be learned, which facilitates the user to use a correct instruction in a later voice operation process to improve the operation speed.

After the user has completed the voice operation learning mode, it indicates that the user has basically mastered how to input the voice instruction correctly. In such case, the voice operation mode can be entered. In the operation mode, the user is not required to touch the screen and can control the terminal device only by the voice instruction, so that user experiences are improved.

In S40, voice information is received in the voice operation mode.

When the terminal device enters the voice operation mode, a special display manner for the voice operation mode can be performed on the display interface to facilitate operation of the user. For example, each application displayed on the display interface is numbered. For another example, when the voice information received by the terminal device includes the voice instruction, the terminal device can display the instruction information input by the user on the display interface such that the user confirms whether the instruction received by the terminal device is the same as the instruction in the voice information input by the user or not.

In S50, the terminal device is controlled according to a voice instruction in the received voice information to execute an operation corresponding to the voice instruction.

The terminal device, after receiving the voice information, determines the voice instruction in the voice information. The terminal device determines a control instruction according to the voice instruction and executes an action corresponding to the control instruction. The voice instruction corresponding to the action can also be displayed on the display interface while executing the action.

According to the method in the embodiment, the terminal device can output information through the display interface or can output the information in a playing manner, and the user can input the instruction to the terminal device in only the voice manner and can control the terminal device to execute the action corresponding to the voice instruction without touching the display screen, so that the terminal device can still be controlled when the hands of the user are occupied.

In addition, according to the method in the embodiment, when the user activates the voice operation mode through the voice mode activation instruction under the preset condition, the voice operation learning mode can be entered before the voice operation mode is entered, to guide the user on how to control the terminal device through the voice, so that conveniences are brought to use of the user, an interaction experience of the user is improved, and subsequent control of the terminal device by the user in the voice manner is more efficient.

In addition, according to the method in the embodiment, when the user cannot operate the terminal device with double hands and the terminal device cannot receive control information in a touch manner, the voice operation mode of the present disclosure can be used to control the terminal device based on the voice instruction in the received voice information, so that the hands of the user are freed truly.

Figure 2:
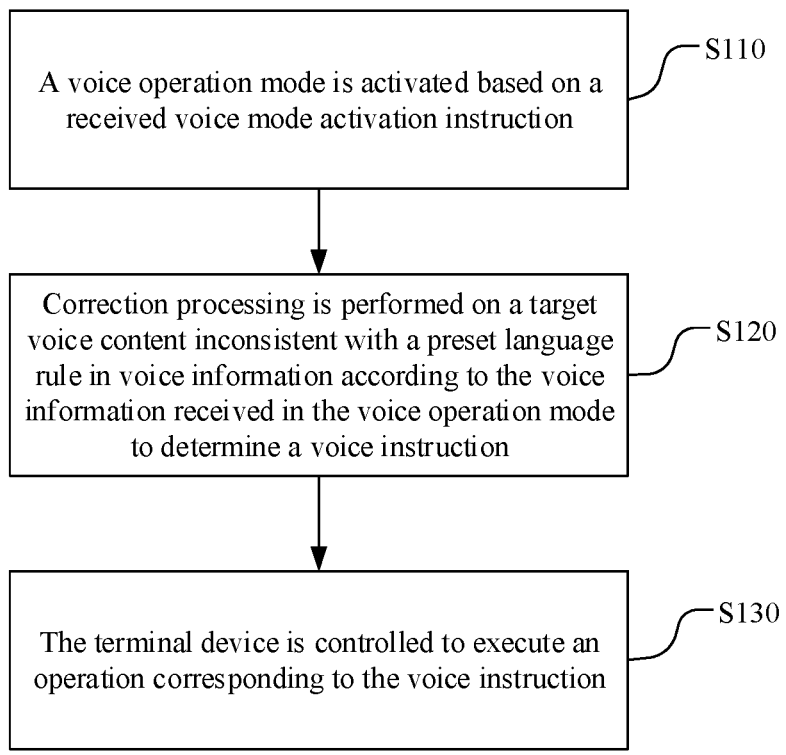
FIG. 2 is a flowchart of a method for controlling an operation mode of a terminal device according to one or more examples.

According to one or more examples, as illustrated in FIG. 2, the present disclosure provides a method for controlling an operation mode of a terminal device. The method in the present disclosure is applied to the terminal device such as a mobile phone and a tablet computer, and is adopted to control the operation mode of the terminal device. The operation mode can be, for example, a voice control mode of implementing control completely through a voice, or can be a touch mode of implementing control in a touch manner. The method in the embodiment includes the following operations.

In S110, a voice operation mode is activated based on a received voice mode activation instruction.

The terminal device can have multiple operation modes such as the voice operation mode and a touch operation mode, and a user can select a suitable mode according to an own requirement. In the embodiment, a control method in the voice operation mode is mainly described. The voice operation mode is not necessarily suitable for all populations. The voice operation mode can only be suitable for some special persons such as the elderly with poor eye sights and a population with wounded hands and unable to operate conveniently, or suitable for some populations pursuing electronic interaction experiences. Therefore, the voice operation mode is not a default setting mode of the terminal device, but when the user has a corresponding requirement, the voice operation mode is activated through the voice mode activation instruction input by the user.

Herein, the voice mode activation instruction received by the terminal device can be a first activation instruction input by operating a display interface of the terminal device, or, a second activation instruction input in a voice manner.

Herein, the first activation instruction can be, for example, executing a touch operation on a "voice operation mode control icon" in a status bar convenient control entry interface. The status bar convenient control entry interface can be called in a top-down sliding or left-to-right sliding manner. In addition to the voice operation mode control icon, the status bar convenient control entry interface can also include an "airplane mode control icon", a "silent mode control icon", a "screen orientation locking control icon", "a mobile network control icon", a "wireless network control icon" and the like. When the user is intended to enter the voice operation mode, the "voice operation mode control icon" can be lighted up in a touch operation manner to enter the voice operation mode to control the terminal device through voice information. When the user is intended to exit the voice operation mode, the lighting of the "voice operation mode control icon" can be cancelled in the touch manner to exit the voice operation mode to recover a default control mode to control the terminal device.

The second activation instruction can be, for example, activating the "voice operation mode" in the voice manner. For example, the user can wake up a voice recognition function of the terminal device through a predetermined wakeup statement (for example, XX student) and speak a voice instruction "activate the voice operation mode" to control the terminal device to enter the "voice operation mode" and further control the terminal device completely through the voice information spoken by the user. When the user is intended to stop the use of the voice operation mode, a voice instruction "exit the voice operation mode" can be spoken to exit the voice operation mode to recover the default control mode to control the terminal device.

It is to be noted that the second activation instruction involves entering the "voice operation mode" in the voice manner, but a calculation process and feedback of the terminal device for the second activation instruction are only limited to entering the "voice operation mode" and do not involve control based on other action instructions such as "click" and "slide". The implementation methods and control processes of control based on the other action instructions are different from those in the "voice operation mode". That is to say, when the terminal device does not enter the "voice operation mode", the terminal device can also receive and recognize voice information, but is limited to perform calculation and feedback according to contents in the voice information and does not involve execution of an operation corresponding to a control instruction in the voice information. The terminal device can execute the operation corresponding to control in the voice information only when entering the "voice operation mode". For example, when the "voice operation mode" is not entered, if the user speaks "slide the picture", the terminal device does not make any response or gives to the user a feedback that the operation cannot be executed. However, in the "voice operation mode", if the user speaks "slide the picture", a picture displayed on the display interface can be slid upwards or downwards.

In S120, correction processing is performed on a target voice content inconsistent with a preset language rule in voice information according to the voice information received in the voice operation mode to determine a voice instruction.

When the voice operation mode is entered, the user can control the terminal device through a voice, and the terminal device inevitably collects a sound signal around the terminal device through a Microphone (MIC). The sound signal can include noise information and voice information. The voice information refers to words that the user is intended to express and are configured to control the terminal device, for example, "louder", "turn on the camera" and "play songs". The noise information refers to a sound unrelated to control over the terminal device, for example, a cough of the user and a traffic noise in an environment. After the terminal device collects the sound signal, the voice information, for controlling the terminal device, of the user is separated from the sound signal at first, and then processing is performed according to whether the separated voice information is consistent with a preset voice rule or not.

The method in the embodiment supports Chinese voice control. A subject, a predicate, an object, a phrase and the like are often involved in a Chinese expression process, and the phrase can further be divided into a phrase of a verb-object structure, a phrase of a subject-predicate structure and the like. However, the user uses the language freely in daily life and does not express strictly according to requirements of the phrase structures, or, when the user outputs the voice information, some important parts in the voice information are covered by noises around, these situations result in that a content, which is configured to operate the terminal device, in the voice information separated from sound information by the terminal device is not so explicit, namely the target voice content in the voice information is inconsistent with the preset language rule. The target voice content involves a content of a control instruction, for example, "click the weather icon", "slide", "launch WeChat" and "desktop". If the target voice content is inconsistent with the preset language rule (the preset language rule is, for example, a "verb-object phrase" and/or a "subject-predicate phrase"), namely a target voice phrase is a word such as "Bluetooth (BT)" and "click", it is necessary to perform correction processing on the target voice content to correct the target voice content into a language structure consistent with the preset language rule and determine the corrected language structure as the voice instruction.

In S130, the terminal device is controlled to execute an operation corresponding to the voice instruction.

After the voice instruction is determined in S120, the terminal device can execute the corresponding operation according to a specific content of the voice instruction. For example, the voice instruction is "slide the picture downwards" or "slide the picture top down", and in such case, the picture displayed on the display interface of the terminal device can be slid downwards. For another example, when the voice instruction is "back to the desktop", the display interface of the terminal device can be switched from a current interface to a desktop interface.

In the embodiment, in a processing process of the voice information, correction processing is performed on the target voice content inconsistent with the preset language rule to obtain a more accurate voice instruction, so that the problem that the terminal device does not execute a corresponding operation after the user outputs an instruction is avoided. Moreover, the target voice content in the voice information can be corrected, so that the voice operation mode is more intelligent and personalized, the condition that a range of a voice input of the user is qualified to be excessively narrow can be avoided, and the user experiences are improved.

Figure 3:
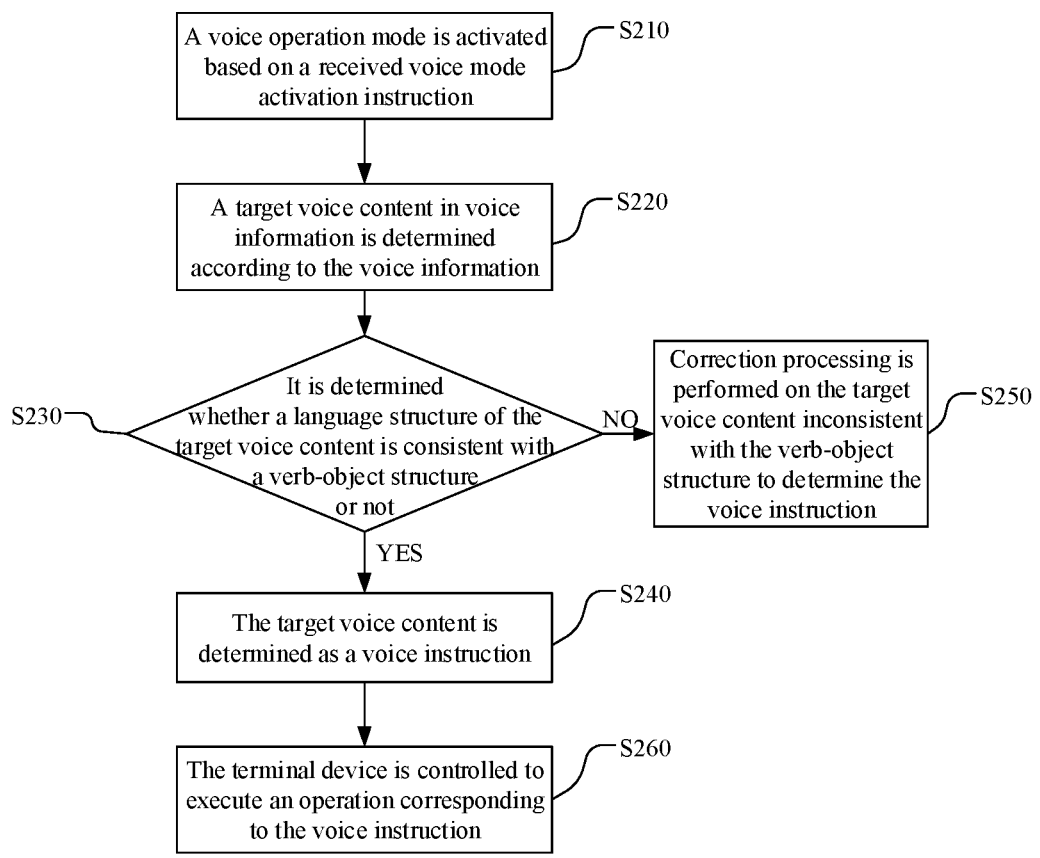
FIG. 3 is a flowchart of a method for controlling an operation mode of a terminal device according to one or more examples.

According to one or more examples, as illustrated in FIG. 3, a method for controlling an operation mode of a terminal device in the embodiment includes the following operations.

In S210, a voice operation mode is activated based on a received voice mode activation instruction.

An implementation manner of the S210 is the same as that in S110, and will not be elaborated herein.

In S220, a target voice content in voice information is determined according to the voice information.

Herein, since the user, when uttering the voice information, can adopt a relatively popular language and can speak something unrelated to an instruction for the terminal device, for improving the operating accuracy and conveniences in the voice operation mode, the terminal device, after receiving the voice information, determines the target voice content in the voice information at first. The target voice content is a content related to the terminal device.

For example, the voice information uttered by the user is "I want to launch WeChat", "launch WeChat" in the voice information is a content related to control over the terminal device, so that the target voice content is "launch WeChat". For another example, if the voice information uttered by the user is "I want to connect the BT earphone to perform voice communication", both "connect the BT earphone" and "voice communication" in the voice information are target voice contents.

In S230, it is determined whether a language structure of the target voice content is consistent with a verb-object structure or not, if YES, S240 is executed, and if NO, S250 is executed.

Various control instructions for the terminal device can be output through the voice instructions substantially adopting the verb-object structure in Chinese. However, a voice used by the user is not always consistent with the verb-object structure. For improving the output accuracy of a control instruction and enabling the terminal device to respond accurately according to the control instruction, it is necessary to determine whether the voice structure of the target voice content is the verb-object structure or not.

For example, the target voice content "launch WeChat" in S220 is a phrase of the verb-object structure, so that the target voice content is not required to be corrected anymore, and the target voice content can be directly determined as a voice instruction. In such case, S240 is executed.

For another example, the target voice content "voice communication" in S220 is not a phrase of the verb-object structure. For ensuring that the terminal device can smoothly execute a control instruction related to "voice communication" in the voice information, it is necessary to execute S250 to correct the target voice content.

In S240, the target voice content is determined as a voice instruction.

In S250, correction processing is performed on the target voice content inconsistent with the verb-object structure to obtain a corrected voice content, and the corrected voice content is determined as the voice instruction.

Herein, the target voice content inconsistent with the verb-object structure is corrected in a correction processing process of the target voice content. The language structure of the target voice content inconsistent with the verb-object structure is corrected into the verb-object structure according to a preset correction rule to obtain the corrected voice content consistent with the verb-object structure, such that the terminal device quickly executes a corresponding operation.

For example, the target voice content "voice communication" in S220 is not a phrase of the verb-object structure. Through the target voice content and in combination with the description "perform voice communication", the target voice content can be corrected into a corrected voice content "enable voice communication", so that the terminal device can quickly execute an operation of enabling a voice communication function.

In the embodiment, if the voice information of the user includes no explicit instruction content, the target voice content can be intelligently matched with a possible related instruction in the correction process of the target voice content. For example, according to a practical scenario and/or a context in the voice information of the user, the target voice content "voice communication" can be corrected into "enable voice communication" or corrected into "disable voice communication" or the like.

The preset correction rule involved in the correction process includes preferential correction into a verb-object structure related to an application and then correction into a verb-object structure related to a system of the terminal device. For example, the target voice content in the voice information of the user is "desktop", and in the correction process of the target voice content "desktop", if a control of an application program related to the content "desktop" is displayed on a current display interface of the terminal device, the target voice content is preferentially corrected into "click the desktop application control". Moreover, for verifying whether correction is implemented correctly, the terminal is controlled to execute an operation corresponding to the instruction "click the desktop application control" (herein, it is the content in S260). If the operation cannot be executed, the target voice content is further corrected into an instruction of the verb-object structure related to the system of the terminal device, for example, corrected into an instruction "back to the desktop".

For another example, when the target voice content is "BT", during correction, the target voice content "BT" is preferentially corrected into a voice instruction "click the BT control". If a content displayed in the current display interface of the terminal device does not involve "BT" and thus the voice instruction "click the BT control" cannot be executed. In such case, the target voice content "BT" is corrected again into a voice instruction "disable the BT control".

For the preset correction rule, it can be understood that a rule that a priority of an application is higher than a priority of a system is adopted to correct the target voice content in the embodiment. Besides this rule, a rule that, for example, the priority of the system is higher than the priority of the application can also be set to correct the target voice content.

In the present disclosure, because the target voice content inconsistent with the verb-object structure can be corrected, on one hand, the accuracy of the voice instruction is improved, and it is convenient for the terminal device to execute the operation quickly; on the other hand, the problem that a range of the voice instruction is qualified to be excessively narrow and no potential operable instruction can be matched automatically can also be avoided.

In S260, the terminal device is controlled to execute an operation corresponding to the voice instruction.

Herein, the terminal device, after determining the voice instruction, can execute the corresponding operation according to the voice to give a feedback to the user. However, if the current display interface of the terminal device cannot execute the content corresponding to the voice instruction, one situation can be that the voice instruction is directly ignored and not executed, and the other situation can be that the voice instruction is executed and, if it is found that the voice instruction cannot be executed, a current content on the display interface is kept unchanged. That is to say, only when the voice instruction is be able to be executed, the terminal device executes the operation corresponding to the voice instruction to provide the user with an operation feedback consistent with the instruction.

In addition, it is to be noted that in the embodiment, for the voice instruction of the verb-object structure (which can be the target voice content consistent with the verb-object structure in the voice information of the user or can be the corrected voice content obtained by correction and consistent with the verb-object structure), each voice instruction (e.g., control instructions for each application control or for the system) corresponds to a respective wrapper pre-stored in the terminal device according to a preset mapping relationship. When the voice instruction is received in the voice operation mode, through calling the wrapper, the terminal device executes the operation corresponding to the voice instruction.

Figure 4:
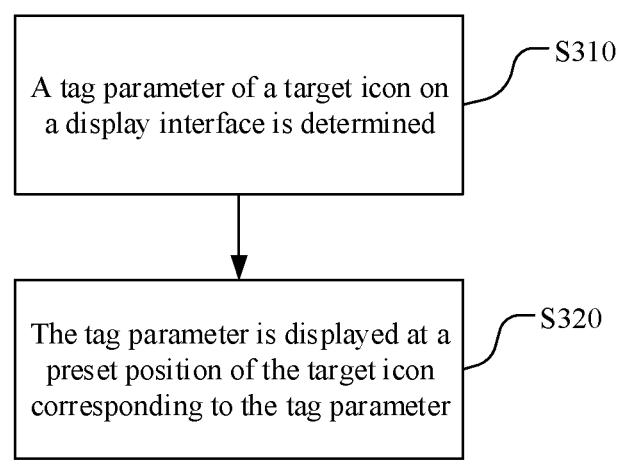
FIG. 4 is a flowchart of a method for controlling an operation mode of a terminal device according to one or more examples.

According to one or more examples, as illustrated in FIG. 4, in the embodiment, in the voice operation mode, the method in the embodiment further includes the following operations.

In S310, a tag parameter of a target icon on a display interface is determined based on a content displayed on the display interface of the terminal device.

Herein, when the voice operation mode is entered, for facilitating some special users (for example, some illiterate old persons and children) to control the terminal device through voice instructions, parameter tagging can be performed on the content displayed on the display interface by numbers. Of course, it can be understood that besides use of a number as a tag parameter, an English letter or a Chinese character can also be used as a tag parameter.

Herein, the target icon refers to a control icon that can be controlled by the user, for example, an application control icon, a date control icon and a weather control icon. That is, the control icon, which is clicked and then gives a further operation feedback, can be determined as a target icon.

When the tag parameter of the target icon on the display interface is determined, the tag parameter can be set after calculation according to a set position of the icon, a color of the icon, a use frequency of the icon and the like, as long as each target icon on the current display interface corresponds to a different tag parameter to ensure conveniences and accuracy of operations of the user. However, the same tag parameter can be adopted for different target icons on different display interfaces.

Figure 8:
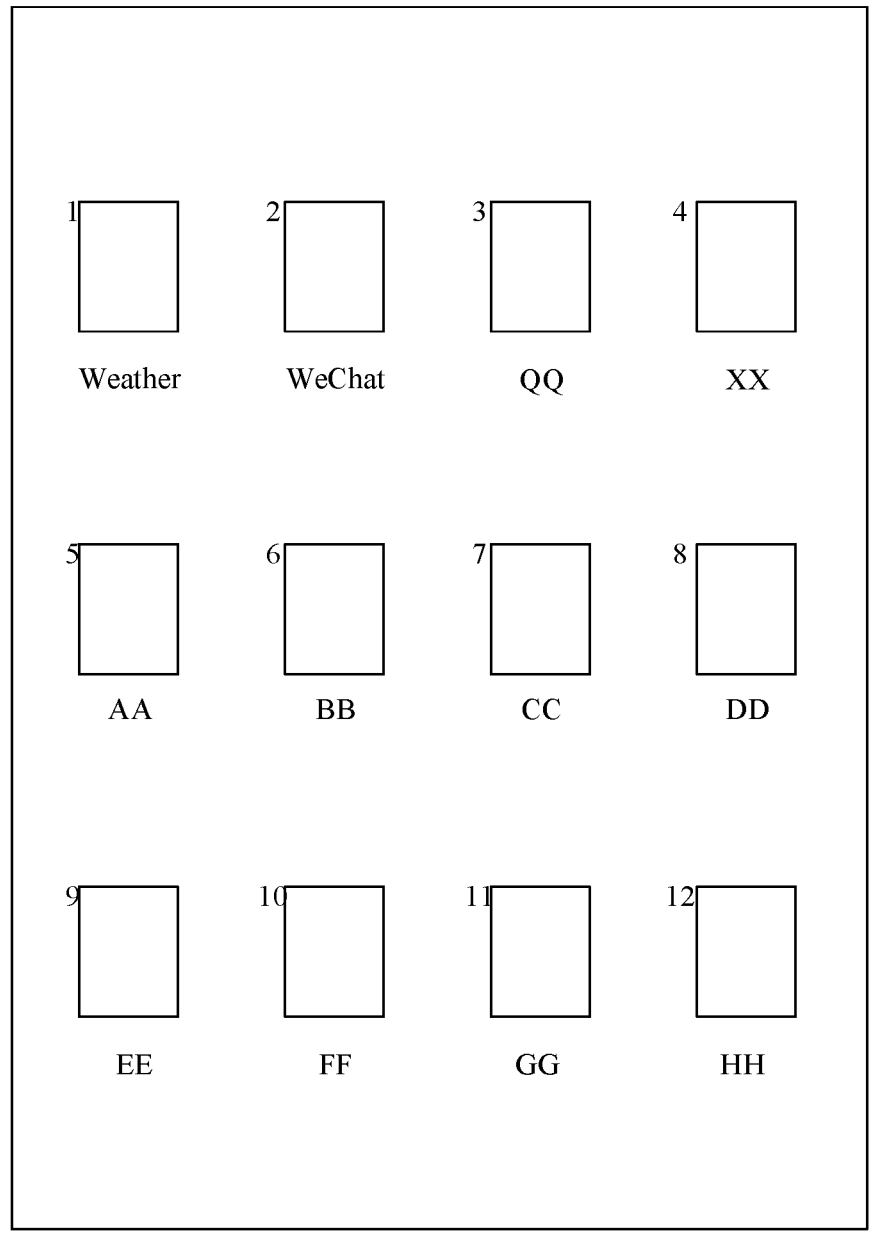
FIG. 8 is a diagram of a display interface of a terminal device according to one or more examples.
Figure 9:
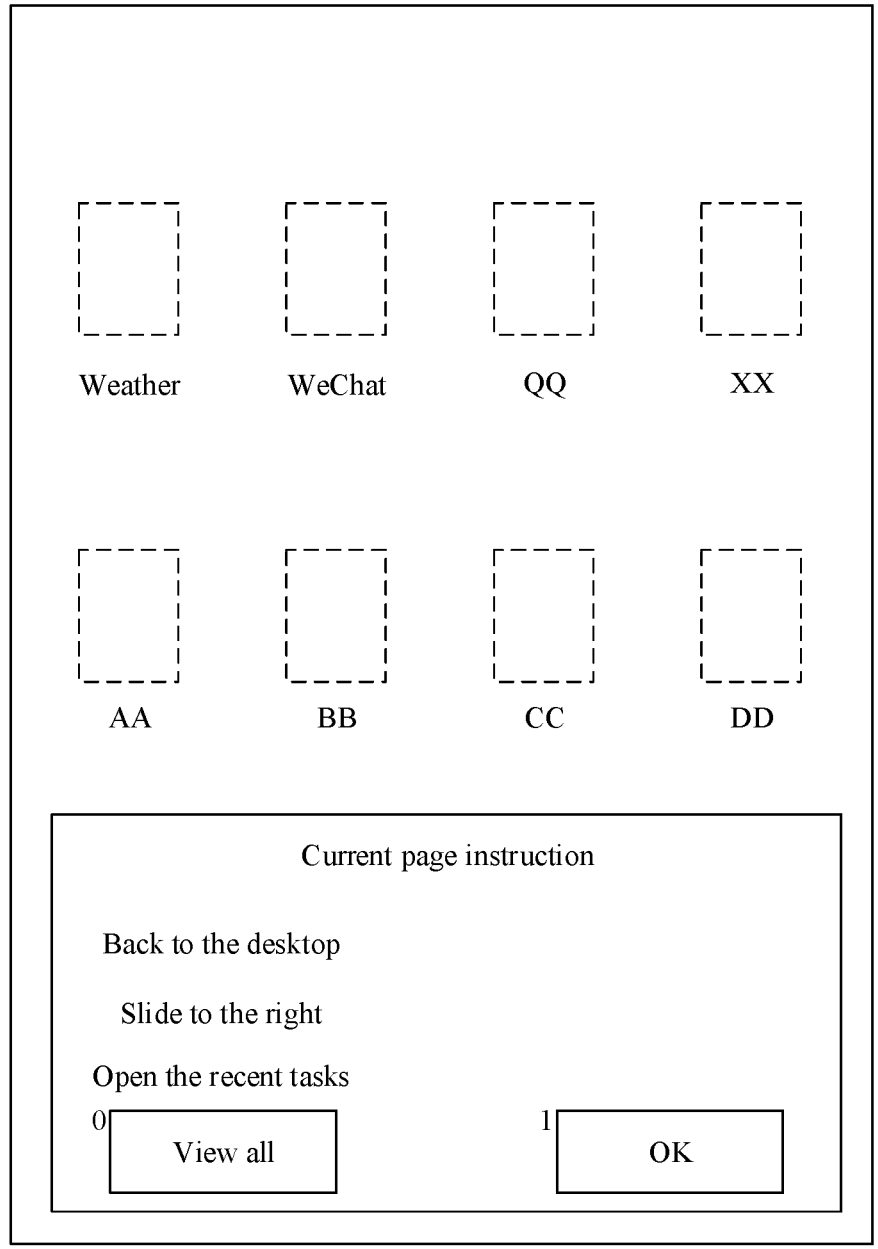
FIG. 9 is a diagram of a display interface of a terminal device according to one or more examples.

As illustrated in FIG. 8 and FIG. 9, FIG. 8 is a display interface of a desktop of the terminal device, and in the interface, controllable target icons are tagged by Arabic numbers. FIG. 9 is controllable icon controls in a dialog box. Both FIG. 8 and FIG. 9 illustrate a tag parameter 1, but because two different display interfaces are illustrated, there is no mutual influence and no chaos of a control process of the terminal device.

It is to be noted here that a part of common icon controls in the target icons include both icon parts and text parts, so that when the user inputs the voice instruction, a voice instruction related to the text part can be used, or a voice instruction related to the tag parameter can be used.

In an example, as illustrated in FIG. 8, a text part of a weather icon control is "weather", and a tag parameter of the weather icon control is 1. In such case, in the voice operation mode, when the voice instruction output by the user is "launch the weather control", a weather application control is activated, and the terminal device displays an interface of a weather application on the display interface of the display screen. Similarly, when the voice instruction output by the user is "launch 1", the weather application control can also be activated, and the terminal device displays the interface of the weather application on the display interface of the display screen.

In another example, as illustrated in FIG. 9, a button "OK" and a button "View all" are displayed in the dialog box, a tag parameter of the button "View all" is 0, and a tag parameter of the button "OK" is 1. When the voice instruction output by the user is "press OK", the terminal device executes an operation corresponding to OK. Similarly, when the voice instruction output by the user is "press 1", the terminal device executes the operation corresponding to OK.

In S320, the tag parameter is displayed at a preset position of the target icon corresponding to the tag parameter.

For facilitating the user to observe the tag parameter and avoiding the user mixing the tag parameter up with the target icon corresponding to the tag parameter, the tag parameter should be displayed at the preset position of the target icon corresponding to the tag parameter. The preset position can be adjusted. For example, the tag parameter is displayed below the icon or in the left upper corner or the right lower corner, etc. However, it is necessary to enable the user to clearly know which one of icons corresponds to which one of tag parameters, so as to avoid the case that the voice instruction output by the user and related to the tag parameter is different from a real intention of the user, which is caused by chaotic correspondences between the icons and the tag parameters.

Figure 5:
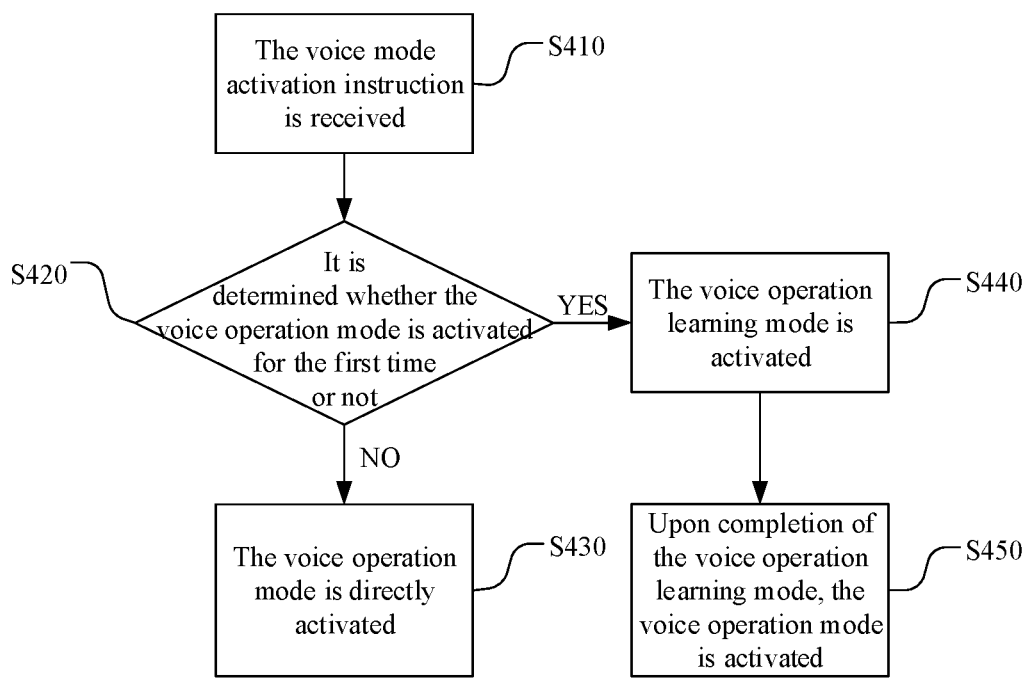
FIG. 5 is a flowchart of a method for controlling an operation mode of a terminal device according to one or more examples.

According to one or more examples, as illustrated in FIG. 5, in a case that a voice mode activation instruction is received, a method for controlling an operation mode of a terminal device in the embodiment includes the following contents.

In S410, the voice mode activation instruction is received.

Herein, the voice mode activation instruction can be a first activation instruction input by operating the display interface of the terminal device, or, a second activation instruction input in the voice manner.

In S420, it is determined whether a voice operation mode is activated for the first time or not, if YES, S440 is executed, and if NO, S430 is executed.

In the related art, after the user activates the voice operation mode, there is no any guided teaching process, so the user does not know how to output a voice instruction more accurately and clearly and also does not know a specific operation feedback, corresponding to the output voice instruction, of the terminal device. The user can only explore on his/her own, thereby resulting in increase of the learning cost of the user. Some users still cannot smoothly and conveniently control terminal devices through voice instructions after thinking on their own for a period of time and will give up using the voice operation mode, thereby making the voice operation mode useless.

In the embodiment, it is determined whether to adopt guided teaching for the user or not by determining whether the user uses the voice operation mode for the first time or not. If the user uses the voice operation mode for the first time, S440 is executed to enter a voice operation learning mode. If it is not the first time for which the user uses the voice operation mode, it indicates that the user has completed the voice operation learning and knows how to control the terminal device in the voice operation mode, S430 can be directly executed to enter the voice operation mode.

In S430, the voice operation mode is directly activated.

After the S430 is executed, the user can directly control the terminal device through the voice instruction.

In S440, the voice operation learning mode is activated.

After the S440 is executed, a learning content pre-stored in the terminal device can be displayed on the display interface of the terminal device to help the user to quickly get familiar with how to output a standard voice instruction and a state of a respective operation feedback, corresponding to each voice instruction, of the terminal device, thereby facilitating the user to quickly master the control method in the voice operation mode, shortening the exploration time, and improving the conveniences for use and the subsequent operation efficiency.

In S450, upon completion of the voice operation learning mode, the voice operation mode is activated.

Herein, since the real intention, of activating the voice operation mode, of the user is to control the terminal device through the voice instruction, after voice operation learning is completed, the voice operation mode is activated, and the user can subsequently operate the terminal device through the voice instruction.

In the embodiment, when the user activates the voice operation mode for the first time, for ensuring that the user outputs the voice instruction more accurately and clearly knows an operation feedback content, corresponding to the voice instruction output by the user itself, of the terminal device, a voice operation learning process is set to avoid the user exploring on his/her own, improve the learning efficiency of the user, help the user to master a using method of the voice operation mode more quickly and improve the conveniences for use.

Figure 6:
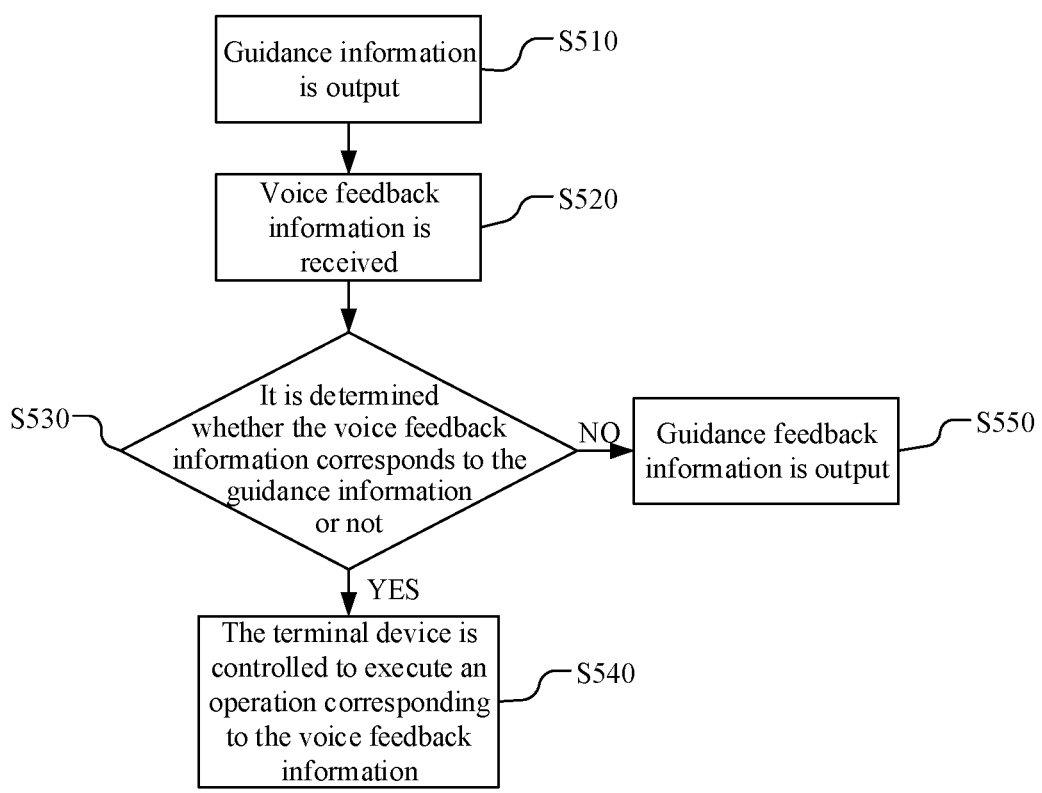
FIG. 6 is a flowchart of a method for controlling an operation mode of a terminal device according to one or more examples.

According to one or more examples, as illustrated in FIG. 6, in a case of entering the voice operation learning mode, the method for controlling the operation mode of the terminal device in the embodiment further includes the following operations.

In S510, guidance information is output.

Herein, after the voice operation learning mode is entered, the terminal device can output the guidance information in the voice manner and/or a text guidance manner to help the user in learning. The guidance information should be a voice instruction recognizable for the terminal device in the voice operation mode, such as a phrase of the verb-object structure.

For example, the terminal device plays a voice "please speak the voice instruction 'launch the settings'", or, the terminal device displays a text content "please speak the voice instruction: launch the [settings]" in form of a dialog box on the display interface.

In S520, voice feedback information is received.

Herein, the terminal device, after outputting the voice instruction, collects sound information around through the MIC to receive the voice content fed back by the user.

In S530, it is determined whether the voice feedback information corresponds to the guidance information or not, if YES, S540 is executed, and if NO, S550 is executed.

Herein, for ensuring that the user has learned how to correctly output the voice instruction, it is necessary to confirm the received voice feedback information to determine whether the user speaks the correct voice instruction or not. Herein, corresponding to the guidance information specifically means being consistent with the guidance information.

For example, the guidance information is "please speak the voice instruction: launch the [settings]" displayed in a text form on the display interface. If the received voice feedback information is "launch the settings", it indicates that the voice feedback information is consistent with the guidance information, and S540 is executed. If the received voice feedback information is "start the settings", it indicates that the voice feedback information is inconsistent with the guidance information, and S550 is executed.

In S540, the terminal device is controlled to execute an operation corresponding to the voice feedback information.

Herein, when the user speaks the voice feedback information corresponding to the guidance information, the terminal device can execute the corresponding operation to ensure that the user can clearly know a state, corresponding to the voice instruction spoken by the user, of the terminal device and help the user to better understand a meaning of the voice instruction uttered by the user.

In addition, when the S540 is executed, the terminal device, when executing the corresponding operation, can also display corresponding encouragement text information such as "well done" and "that's it" on the display interface to provide positive feedback information for the user so as to help the user to know that the voice instruction output by the user is correct.

In S550, guidance feedback information is output.

If the user does not speak the correct voice instruction or a noise in an ambient environment is relatively loud so that the terminal device does not clearly collect the voice feedback information spoken by the user, the terminal device can output the guidance feedback information such as "please say it again" and "please repeat" to prompt the user that there is a problem and the voice instruction is required to be repeated to ensure that the user can master a correct voice instruction output method.

It is to be noted here that there may be more than one piece of guidance information and each piece of guidance information is different. The guidance information should cover all possible control conditions involved in the operation process of the terminal device to help the user to control the terminal device through the voice instruction more conveniently and quickly.

In addition, since some users are intended to skip voice instruction learning to save time, in the learning process, prompt information "skip" is displayed on the display interface of the terminal device, and the user can click "skip" or speak a voice "skip" to skip a current guidance information learning step.

According to one or more examples, since high-power-consumption electric elements, such as the MIC and/or a processor, are required to be used for long when the terminal device works in the voice operation mode, power may be consumed greatly. In the control method in the embodiment, for this problem, two running states in the voice operation mode are set: one is a persistent state, and the other is an automatic state. In the persistent state, the voice operation mode will always run as long as the user does not output a voice instruction of exiting the voice operation mode. In the automatic state, after a certain condition is met, the terminal device can automatically exit the voice operation mode even though the user does not exit the voice operation mode actively.

Figure 7:
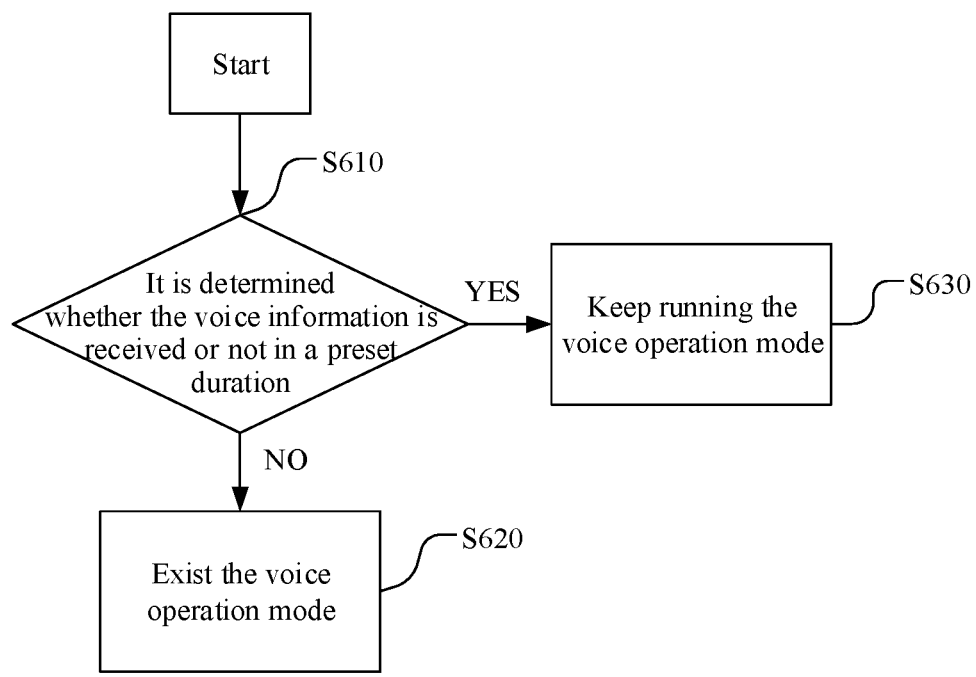
FIG. 7 is a flowchart of a method for controlling an operation mode of a terminal device according to one or more examples.

In an example, as illustrated in FIG. 7, in the automatic state, the method for controlling the operation mode of the terminal device in the embodiment includes the following operations.

In S610, it is determined whether the voice information is received or not in a preset duration, if YES, S630 is executed, and if NO, S620 is executed.

Herein, if the terminal device does not receive the voice information for long, it indicates that the user does not intend to operate the terminal device. In such case, for saving the power of the terminal device, S620 is selected to be executed.

The preset duration can be set by the user to be, for example, 5 minutes or 2 minutes.

If the user can persistently receive the voice information, it indicates that the user always controls the terminal device through the voice instruction. In such case, S630 is executed to keep the voice operation mode.

In S620, it is controlled to exit the voice operation mode.

In S630, the voice operation mode is kept running.

In another example, it can also be determined whether to exit the voice operation mode or not in the automatic state according to the power of the terminal device. For example, in the automatic state, if remaining power of the terminal device is less than or equal to a preset value, it is controlled to exit the voice operation mode.

Of course, it can be understood that the above two examples can be applied to the automatic state of the voice operation mode at the same time, and if any one of the conditions is met, the voice operation mode can be automatically exited to save the power of the terminal device.

Figure 10:
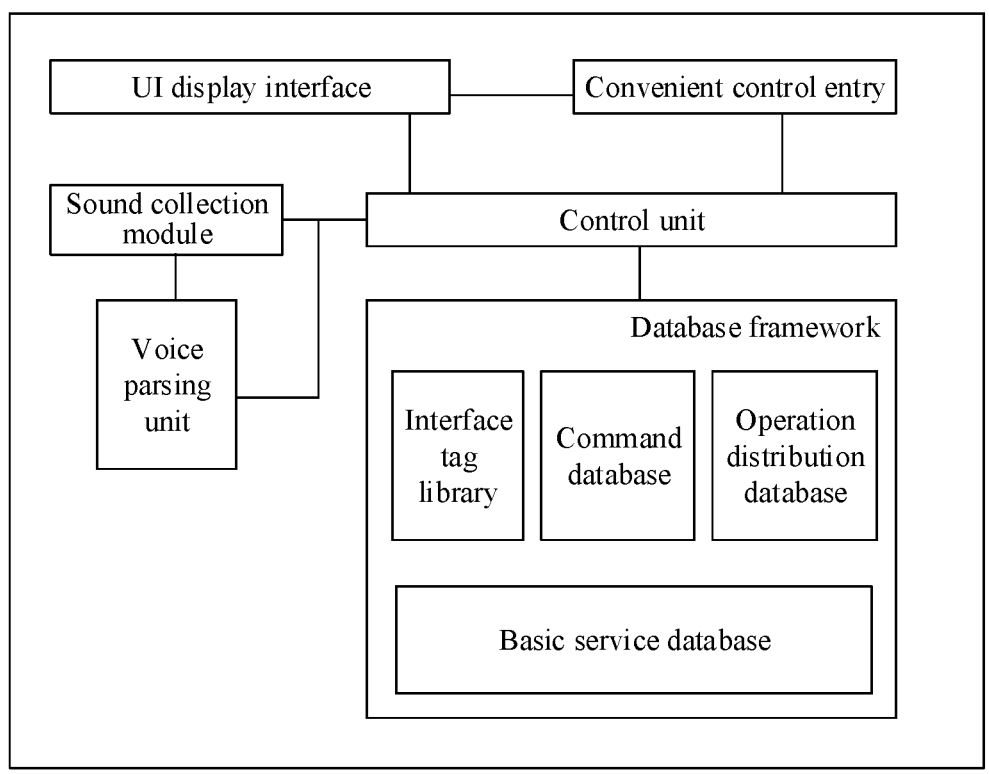
FIG. 10 is a diagram of a framework of a terminal device according to one or more examples.

For describing the method for controlling the operation mode control of the terminal device in the present disclosure in detail, an architecture of the terminal device that performs the control method in the present disclosure is described. The terminal device in the present disclosure can be a mobile terminal such as a mobile phone and a pad. As illustrated in FIG. 10, the architecture of a mobile phone is described with application of the method in the present disclosure to the mobile phone as an example.

The mobile phone includes a sound collection module, a User Interface (UI) display interface and a control unit. The sound collection module can be, for example, a MIC. The UI display interface is, for example, an interface displayed on a display screen. The control unit can be, for example, a main control board of the mobile phone. Both the UI display interface and the sound collection module are electrically connected with the control unit. The sound collection module transmits the collected sound information to the control unit. The control unit transmits a content to be displayed on the display screen to the UI display interface.

The mobile phone also includes a voice parsing unit. The voice parsing unit is electrically connected with the control unit and the sound collection module. The voice parsing unit is configured to process voice information received by the sound collection module to parse a target voice content in the voice information and transmit to the control unit. Data transmission is implemented between the voice parsing unit and the sound collection module through a binary stream.

The mobile phone also includes a convenient control entry. The convenient control entry can be displayed on the UI display interface. The convenient control entry is electrically connected with the control unit. When the convenient control entry is triggered, the control unit controls the terminal device to enter the voice operation mode.

The mobile phone also includes a database framework. The database framework is electrically connected with the control unit to assist the control unit in operating the terminal device. The database framework includes a basic service database, a command database, an operation distribution database and an interface tag library. The basic service database involves an instruction library, a word library, a node scanning algorithm, an AccessibilityManagerService (ABMS) wrapper, an AccessibilityNodeInfo (ANI) wrapper and an XWrapper (another wrapper). The operation command database stores teaching contents for the voice operation learning mode and verb-object structure correction information related to correction processing. The operation distribution database includes a SystemAction unit, a DeviceAction unit, an ApplicationAction unit and the like. The SystemAction unit is configured to assist in execution and implementation of operations of a notification bar, backing and the like. The DeviceAction unit is configured to assist in implementation of operations of voice regulation, BT turning-on/off and the like. The ApplicationAction unit is configured to assist in implementation of operations of click, slide, long-press and the like. The interface tag library is configured to calculate and store tag parameters on the display interface.

The terminal device receives sound information through the sound collection module and receives ABMS information, ActivityManagerService (AMS) information and BluetoothManager (BTM) information through the database framework, so that the terminal device can run stably and reliably in the voice operation mode.

Figure 11:
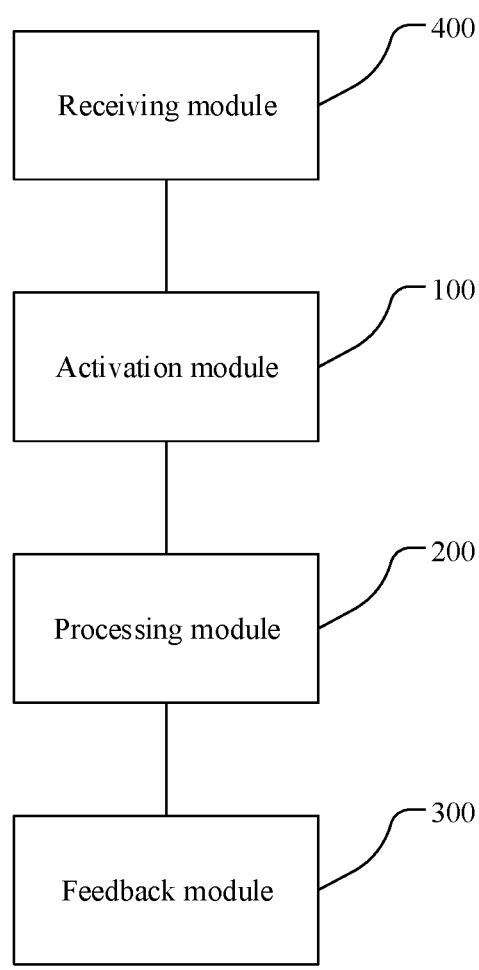
FIG. 11 is a block diagram of a device for controlling an operation mode of a terminal device according to one or more examples.

As illustrated in FIG. 11, the embodiment also provides a device for controlling an operation mode of a terminal device. The device in the embodiment includes an activation module 100, processing module 200, feedback module 300 and receiving module 400 that are electrically connected. The device in the embodiment is configured to execute the aforementioned method for controlling the operation mode of the terminal device.

When the device in the embodiment executes the method for controlling the operation mode of the terminal device in FIG. 1, the activation module 100 is configured to, based on a received voice mode activation instruction under a preset condition, enter a voice operation learning mode and display a voice operation learning interface. The activation module 100 is further configured to, upon completion of the voice operation learning mode, enter a voice operation mode. The receiving module 400 is configured to receive voice information in the voice operation mode. The feedback module 300 is configured to control the terminal device according to a voice instruction in the received voice information to execute an operation corresponding to the voice instruction.

When the device in the embodiment executes the method for controlling the operation mode of the terminal device in FIG. 2, the receiving module 400 is configured to receive the voice mode activation instruction. The activation module 100 is configured to activate the voice operation mode based on the received voice mode activation instruction. The processing module 200 is configured to perform correction processing on a target voice content inconsistent with a preset language rule in the voice information according to the voice information received in the voice operation mode to determine the voice instruction. The feedback module 300 is configured to control the terminal device to execute the operation corresponding to the voice instruction.

In addition, when the device in the embodiment executes the method for controlling the operation mode of the terminal device in FIG. 6, the feedback module 300 is further configured to output guidance information. The processing module is further configured to determine whether voice feedback information corresponds to the guidance information or not based on the received voice feedback information. The feedback module is further configured to, when a determination result is that the voice feedback information corresponds to the guidance information, control the terminal device to execute an operation corresponding to the voice feedback information.

Figure 12:
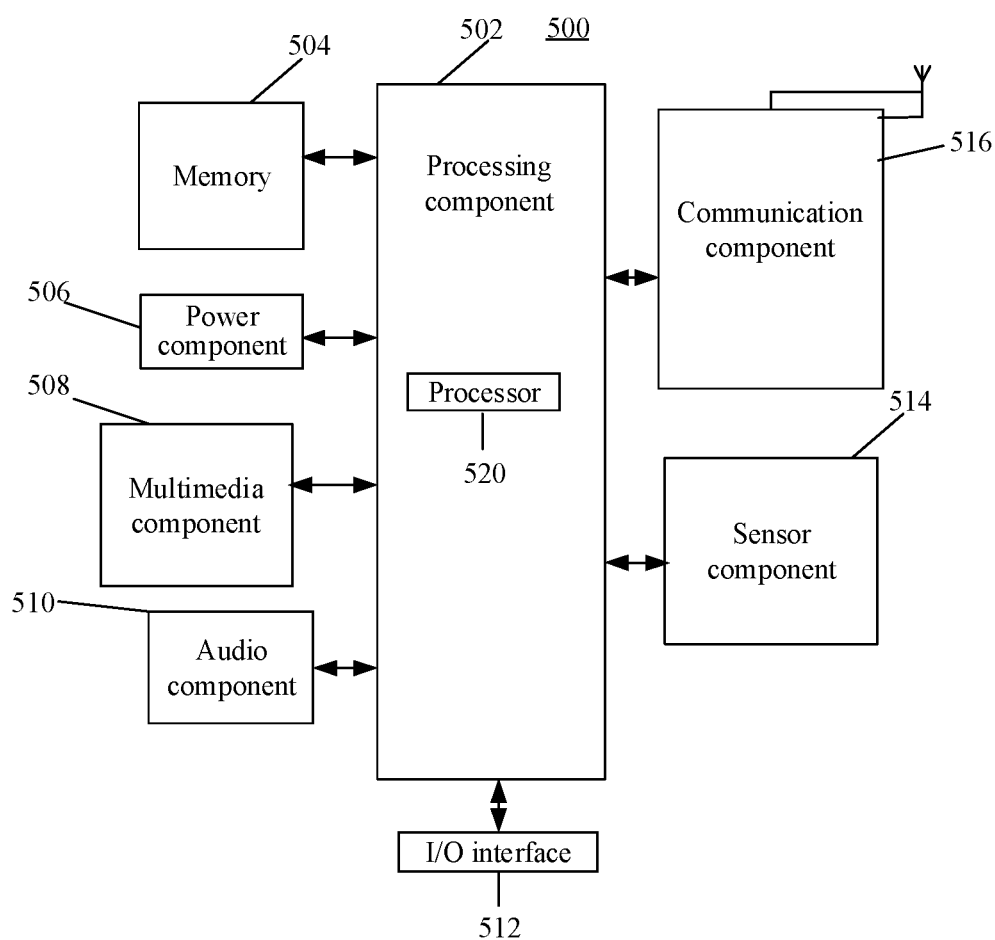
FIG. 12 is a block diagram of a terminal device according to one or more examples.

FIG. 12 is a block diagram of a terminal device.

The present disclosure also provides a terminal device, which includes a processor and a memory configured to store an instruction executable by the processor. The processor is configured to execute the abovementioned method. The device 500 can be a mobile phone, a computer, a digital broadcast terminal, a messaging device, a gaming console, a tablet device, a medical device, exercise equipment, a personal digital assistant and the like. The terminal device can also be a photosensitive element, for example, a light sensor.

The device 500 can include one or more of the following components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 can include one or more processors 520 to execute instructions to perform all or part of the operations in the abovementioned method. Moreover, the processing component 502 can include one or more modules which facilitate interaction between the processing component 502 and the other components. For instance, the processing component 502 can include a multimedia module to facilitate interaction between the multimedia component 508 and the processing component 502.

The memory 504 is configured to store various types of data to support the operation of the device 500. Examples of such data include instructions for any application programs or methods operated on the device 500, contact data, phonebook data, messages, pictures, video, etc. The memory 504 can be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 can include a power management system, one or more power supplies, and other components associated with generation, management and distribution of power for the device 500.

The multimedia component 508 includes a screen providing an output interface between the device 500 and a user. In some embodiments, the screen can include a Liquid Crystal Display (LCD) and a Touch Panel (TP). If the screen includes the TP, the screen can be implemented as a touch screen to receive an input signal from the user. The touch panel includes one or more touch sensors to sense touches, slides and gestures on the touch panel. The touch sensors can not only sense a boundary of a touch or slide action but also detect a duration and pressure associated with the touch or slide action. In some embodiments, the multimedia component 508 includes a front camera and/or a rear camera. The front camera and/or the rear camera can receive external multimedia data when the device 500 is in an operation mode, such as an image capturing mode or a video mode. Each of the front camera and the rear camera can be a fixed optical lens system or have focusing and optical zooming capabilities.

The audio component 510 is configured to output and/or input an audio signal. For example, the audio component 510 includes a MIC, and the MIC is configured to receive an external audio signal when the device 500 is in the operation mode, such as a call mode, a recording mode and a voice recognition mode. The received audio signal can further be stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module can be a keyboard, a click wheel, a button and the like. The button can include, but not limited to: a home button, a volume button, a starting button and a locking button.

The sensor component 514 includes one or more sensors configured to provide status assessment in various aspects for the device 500. For instance, the sensor component 514 can detect an on/off status of the device 500 and relative positioning of components, such as a display and small keyboard of the device 500. The sensor component 514 can further detect a change in a position of the device 500 or a component of the device 500, presence or absence of contact between the user and the device 500, orientation or acceleration/deceleration of the device 500 and a change in temperature of the device 500. The sensor component 514 can include a proximity sensor configured to detect presence of an object nearby without any physical contact. The sensor component 514 can also include a light sensor, such as a Complementary Metal Oxide Semiconductor (CMOS) or Charge Coupled Device (CCD) image sensor, configured for use in an imaging application. In some embodiments, the sensor component 514 can also include an acceleration sensor, a gyroscope sensor, a magnetic sensor, a pressure sensor or a temperature sensor.

The communication component 516 is configured to facilitate wired or wireless communication between the device 500 and another device. The device 500 can access a communication-standard-based wireless network, such as a Wireless Fidelity (WiFi) network, a 2nd-Generation (2G) or 3rd-Generation (3G) network or a combination thereof. In an embodiment, the communication component 516 receives a broadcast signal or broadcast associated information from an external broadcast management system through a broadcast channel. In an embodiment, the communication component 516 further includes a Near Field Communication (NFC) module to facilitate short-range communication. For example, the NFC module can be implemented based on a Radio Frequency Identification (RFID) technology, an Infrared Data Association (IrDA) technology, an Ultra Wide Band (UWB) technology, a BT technology and another technology.

In an embodiment, the device 500 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In another embodiment of the present disclosure, there is also provided a non-transitory computer-readable storage medium, such as the memory 504 including an instruction, and the instruction can be executed by the processor 520 of the device 500 to implement the abovementioned method. For example, the computer-readable storage medium can be a ROM, a Random Access Memory (RAM), a Compact Disc Read-Only Memory (CD-ROM), a magnetic tape, a floppy disc, an optical data storage device and the like. The instruction in the storage medium can be executed by a processor of a terminal device to enable the terminal device to execute the abovementioned method.

Other implementation solutions of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling an operation mode of a terminal device, performed by a processor of the terminal device, comprising:

entering a voice operation learning mode and displaying a voice operation learning interface based on a received voice mode activation instruction under a preset condition, wherein the voice operation learning interface is configured to guide a user to output a voice instruction;

controlling the terminal device to output guidance information on the voice operation learning interface, determining, based on received voice feedback information, whether the voice feedback information is consistent with the guidance information or not;

controlling the terminal device to execute an operation corresponding to the voice feedback information in response to determining that the voice feedback information is consistent with the guidance information;

entering a voice operation mode upon completion of the voice operation learning mode, wherein in the voice operation mode, the terminal device is controlled by receiving voice information in response to determining that no touch information is received;

receiving voice information in the voice operation mode;

determining a target voice content in the voice information according to the voice information;

determining whether a language structure of the target voice content is consistent with a verb-object structure or not;

determining the target voice content as a voice instruction in response to determining that the language structure of the target voice content is consistent with the verb-object structure;

performing correction processing on the target voice content inconsistent with the verb-object structure to obtain a corrected voice content and determining the corrected voice content as the voice instruction in response to determining that the language structure of the target voice content is inconsistent with the verb-object structure; and controlling, according to the voice instruction, the terminal device to execute an operation corresponding to the voice instruction.

2. The method of claim 1, wherein entering the voice operation learning mode and displaying the voice operation learning interface based on the received voice mode activation instruction under the preset condition comprises:

determining, based on the received voice mode activation instruction, whether the preset condition is met or not;

directly activating the voice operation mode in response to determining that the preset condition is not met, wherein the preset condition is that the voice operation mode is activated for a first time; and entering the voice operation learning mode and displaying the voice operation learning interface in response to determining that the preset condition is met.

3. The method of claim 1, wherein performing correction processing on the target voice content inconsistent with the verb-object structure comprises:

correcting the language structure of the target voice content inconsistent with the verb-object structure into the verb-object structure according to a preset correction rule, wherein the preset correction rule comprises: correcting the language structure of the target voice content into a first verb-object structure related to an application, and correcting the language structure of the target voice content into a second verb-object structure related to a system of the terminal device in response to determining that an operation corresponding to the target voice content of which the corrected language structure has been the first verb-object structure related to the application is not be able to be executed by the terminal device.

4. The method of claim 1, wherein the voice mode activation instruction comprises:

a first activation instruction input by operating a display interface of the terminal device, or a second activation instruction input in a voice manner.

5. The method of claim 1, further comprising: in the voice operation mode, determining, based on a content displayed on a display interface of the terminal device, a tag parameter of a target icon on the display interface; and displaying the tag parameter at a preset position of the target icon corresponding to the tag parameter.

6. The method of claim 1, further comprising:

controlling, based on an operating state selected by the user, the voice operation mode to run in a persistent state or an automatic state.

7. The method of claim 6, further comprising: in the automatic state, performing at least one of following acts:

controlling to exit the voice operation mode in response to determining that the voice information is not received in a preset duration; or controlling to exit the voice operation mode in response to determining that remaining power of the terminal device is less than or equal to a preset value.

8. A device for controlling an operation mode of a terminal device, comprising:

a processor; and a memory coupled with the processor and configured to store an instruction that, when executed by the processor, causes the processor to:

enter a voice operation learning mode and display a voice operation learning interface based on a received voice mode activation instruction under a preset condition, wherein the voice operation learning interface is configured to guide a user to output a voice instruction;

control the terminal device to output guidance information on the voice operation learning interface, determine, based on received voice feedback information, whether the voice feedback information is consistent with the guidance information or not;

control the terminal device to execute an operation corresponding to the voice feedback information in response to determining that the voice feedback information is consistent with the guidance information;

enter a voice operation mode upon completion of the voice operation learning mode, wherein in the voice operation mode, the terminal device is controlled by receiving voice information in response to determining that no touch information is received;

receive voice information in the voice operation mode;

determining a target voice content in the voice information according to the voice information;

determining whether a language structure of the target voice content is consistent with a verb-object structure or not;

determining the target voice content as a voice instruction in response to determining that the language structure of the target voice content is consistent with the verb-object structure;

performing correction processing on the target voice content inconsistent with the verb-object structure to obtain a corrected voice content and determining the corrected voice content as the voice instruction in response to determining that the language structure of the target voice content is inconsistent with the verb-object structure; and control the terminal device according to the voice instruction to execute an operation corresponding to the voice instruction.

9. The device of claim 8, wherein the processor is configured to:

determine whether the preset condition is met or not based on the received voice mode activation instruction;

directly activate the voice operation mode in response to determining that the preset condition is not met, wherein the preset condition is that the voice operation mode is activated for a first time; and enter the voice operation learning mode and display the voice operation learning interface in response to determining that the preset condition is met.

10. The device of claim 8, wherein the processor is configured to:

correct the language structure of the target voice content inconsistent with the verb-object structure into the verb-object structure according to a preset correction rule, wherein the preset correction rule comprises: correcting the language structure of the target voice content into a first verb-object structure related to an application, and correcting the language structure of the target voice content into a second verb-object structure related to a system of the terminal device in response to determining that an operation corresponding to the target voice content of which the corrected language structure has been the first verb-object structure related to the application is not be able to be executed by the terminal device.

11. The device of claim 8, wherein the processor is further configured to:

determine, based on a content displayed on a display interface of the terminal device, a tag parameter of a target icon on the display interface; and display the tag parameter at a preset position of the target icon corresponding to the tag parameter.

12. The device of claim 8, wherein the processor is further configured to:

control, based on an operating state selected by the user, the voice operation mode to run in a persistent state or an automatic state.

13. The device of claim 12, wherein the processor is further configured to: in the automatic state, perform at least one of following acts:

controlling to exit the voice operation mode in response to determining that the voice information is not received in a preset duration; or controlling to exit the voice operation mode in response to determining that remaining power of the terminal device is less than or equal to a preset value.

14. A non-transitory computer-readable storage medium, having stored thereon an instruction that, when executed by a processor of a terminal device, enables the terminal device to perform acts comprising:

entering a voice operation learning mode and displaying a voice operation learning interface based on a received voice mode activation instruction under a preset condition, wherein the voice operation learning interface is configured to guide a user to output a voice instruction;

control the terminal device to output guidance information on the voice operation learning interface, determine, based on received voice feedback information, whether the voice feedback information is consistent with the guidance information or not;

control the terminal device to execute an operation corresponding to the voice feedback information in response to determining that the voice feedback information is consistent with the guidance information;

entering a voice operation mode upon completion of the voice operation learning mode, wherein in the voice operation mode, the terminal device is controlled by receiving voice information in response to determining that no touch information is received;

receiving voice information in the voice operation mode;

determining a target voice content in the voice information according to the voice information;

determining whether a language structure of the target voice content is consistent with a verb-object structure or not;

determining the target voice content as a voice instruction in response to determining that the language structure of the target voice content is consistent with the verb-object structure;

performing correction processing on the target voice content inconsistent with the verb-object structure to obtain a corrected voice content and determining the corrected voice content as the voice instruction in response to determining that the language structure of the target voice content is inconsistent with the verb-object structure; and controlling, according to the voice instruction, the terminal device to execute an operation corresponding to the voice instruction.

* * * * *